United States Patent [19]

Dalla-Piazza

[11] Patent Number: 5,287,745
[45] Date of Patent: Feb. 22, 1994

[54] ANGULAR SPEED MEASURING DEVICE

[75] Inventor: Silvio Dalla-Piazza, St-Imier, Switzerland

[73] Assignee: Asulab S.A., Bienne, Switzerland

[21] Appl. No.: 890,928

[22] Filed: May 29, 1992

[30] Foreign Application Priority Data

May 31, 1991 [FR] France ................. 91 06708

[51] Int. Cl.⁵ .............................. G01P 15/00
[52] U.S. Cl. .................................... 73/505
[58] Field of Search ............... 73/505, 518; 364/565

[56] References Cited

U.S. PATENT DOCUMENTS

| | | | |
|---|---|---|---|
| 4,671,112 | 6/1987 | Kimura et al. | 73/505 |
| 4,712,426 | 12/1987 | Peters | 73/505 |
| 4,799,385 | 1/1989 | Hulsing et al. | 73/505 |
| 4,899,587 | 2/1990 | Staudte | 73/505 |
| 5,197,331 | 3/1993 | Oikawa | 73/505 |

FOREIGN PATENT DOCUMENTS

0161049 11/1985 European Pat. Off. .
3805250 8/1989 Fed. Rep. of Germany .

Primary Examiner—Hezron E. Williams
Assistant Examiner—Michael Brock
Attorney, Agent, or Firm—Weil, Gotshal & Manges

[57] ABSTRACT

The device comprises a transducer which supplies, in response to an exciting signal, a detection signal that is representative of its angular speed, and a circuit which responds to this detection signal to supply an angular speed measurement signal. For this measurement signal to be readily usable regardless of the transducer, the circuit measures the phase difference between the detection signal and the exciting signal, this phase difference being representative of the angular speed of the transducer.

3 Claims, 5 Drawing Sheets

ANGULAR SPEED MEASURING DEVICE

The present invention relates to an angular speed measuring device comprising:
- a transducer intended to rotate at said angular speed;
- means for producing an exciting signal having a first frequency;
- means for exciting a first vibration of said transducer in response to said exciting signal;
- means for producing a detection signal including at least one component having an amplitude representative of the amplitude of a second vibration of said transducer, said second vibration being coupled to said first vibration and having an amplitude representative of said angular speed; and
- means for producing a measurement signal representative of said angular speed in response to said detection signal.

BACKGROUND OF THE INVENTION

It is well-known that a transducer used in a device satisfying the above definition has an axis, in the mathematical meaning of the word, which may be termed the main axis, and that the signal it produces is a measure of its angular speed about this main axis or, in other words, of the projection on this main axis of the vector representing its angular speed.

Further, such a device is obviously intended to measure, in fact, the angular speed of an object to which this transducer is secured.

In order not unduly to complicate the following description, use will be made therein of the expression "angular speed of the transducer" to designate the angular speed (or velocity), about the above-mentioned main axis, of the object to which this transducer is secured.

U.S. Pat. No. 4,899,587, for instance, describes a transducer that can be used in such a device.

This transducer comprises two tuning forks having a common base which are chemically etched, along with the base, in a thin plate of Z-cut quartz such that the longitudinal axis of the tuning forks is substantially parallel to the Y, or mechanical, axis of the quartz. Electrodes for exciting a first vibration of the transducer are arranged on the prongs of one of the tuning forks so as to cause an alternating and periodic flexing of these prongs in the plane of the transducer when they receive an exciting signal E from a suitable electronic circuit.

The two tuning forks being mechanically coupled by their common base, the prongs of the second tuning fork also undergo an alternating and periodic flexing in the plane of the transducer in response to exciting signal E.

When the exciting signal E is applied to the transducer, and the latter is rotated about an axis parallel to the longitudinal axis of the tuning forks, the prongs of the latter are subjected to the Coriolis force resulting from this rotation. This Coriolis force modifies the transducer's vibration which can then be considered as being formed by the superposition of the first vibration described above and of a second vibration consisting of a flexing vibration of the tuning forks prongs in a direction perpendicular to the plane of the transducer.

Detection electrodes are arranged on the prongs of the second tuning fork of the transducer to produce a detection signal D in response to this second vibration.

U.S. Pat. No. 4,899,587 discloses no circuit able to process this detection signal D to produce a measurement signal of the angular speed of the transducer.

U.S. Pat. No. 4,671,112, which describes another type of transducer that can be used in an angular speed measuring device, describes also a circuit that could be used to produce a measurement signal of the angular speed of the transducer in U.S. Pat. No. 4,899,587, or any other transducer intended for the same use.

This circuit includes a conventional mixing circuit, which mixes a first signal P having an amplitude that is proportional to the amplitude of detection signal D with a second signal, called reference signal F, having an amplitude that is proportional to the amplitude of exciting signal E.

In this circuit, the mixed signal produced by this mixing circuit is filtered by a low-pass filter which suppresses its ac component and only allows its dc component through, the latter being then amplified by a dc amplifier which issues on its output a measurement signal of the angular speed of the transducer. This latter signal will hereinafter be called signal M in the description.

To simplify the considerations that will follow, it will be assumed that signals E, F, D and P are sinusoidal, that signal F is in phase with signal E and that signal P is also in phase with signal D.

Under these conditions, signal E may be expressed by equation:

$$E = \hat{E} \sin \omega t \quad (1)$$

in which $\hat{E}$ and $\omega$ respectively are the amplitude and the angular frequency of signal E, and signal F may be expressed by equation:

$$F = K1 \cdot \hat{E} \sin \omega t \quad (2)$$

in which K1 is the gain of the circuit that produces signal F from signal E.

As is also well-known, detection signal D includes a first component which consists of the signal that appears across the detection electrodes of the transducer when the angular speed of the latter is zero, and a second component which consists of the signal that superposes itself on this first component when the transducer's angular speed is not zero.

The first component of signal D, hereinafter termed component $D_1$, may be expressed by equation:

$$D1 = \hat{D}_1 \sin(\omega t + \phi_1) \quad (3)$$

in which $\hat{D}_1$ and $\phi_1$ respectively are the amplitude of component $D_1$ and its phase-shift in relation to exciting signal E, these two terms being constant and being dependent only on the transducer being used but not, of course, on its angular speed.

The second component of signal D, hereinafter termed component $D_2$, may be expressed by equation:

$$D_2 = \hat{D}_2 \sin(\omega t + \phi_1 + \phi_2) \quad (4)$$

in which $\hat{D}_2$ and $\phi_2$ respectively are the amplitude of component $D_2$, which depends on the transducer s angular speed, and the phase shift of component $D_2$ in relation to component $D_1$, which is also constant and independent of the transducer's angular speed.

Signal D, which consists of the superposition of its components $D_1$ and $D_2$, is thus expressed by equation:

$$D = \hat{D}_1.\sin(\omega t + \phi_1) + \hat{D}_2.\sin(\omega t + \phi_1 + \phi_2) \quad (5)$$

The above-mentioned signal P may thus be expressed by equation:

$$P = K2.[\hat{D}_1.\sin(\omega t + \phi_1) + \hat{D}_2.\sin(\omega t + \phi_1 + \phi_2)] \quad (6)$$

in which K2 is the gain of the circuit that produces signal P from signal D.

As mentioned earlier, signals F and P are mixed and the signal resulting from this mixing is filtered by a low-pass filter that only lets through its dc component, the latter being finally amplified by a dc amplifier that delivers measurement signal M.

It will readily be seen that, under these conditions, signal M is expressed by equation:

$$M = K3.[\hat{D}_1.\cos\phi_1 + \hat{D}_2.\cos(\phi_1 + \phi_2)] \quad (7)$$

in which K3 is equal to the product of gains K1 and K2 mentioned earlier, of the low-pass filter's gain, of the dc amplifier's gain, and of a factor ½ that stems from the calculation of equation (7) from equations (1) and (6).

As already stated, the amplitude $\hat{D}_1$ of the component $D_1$ of signal D and the phase-shifts $\phi_1$ and $\phi_2$ defined above depend only on the transducer being used and not on the angular speed of the latter, the only factor that is dependent on this angular speed in equation (7) therefore being the amplitude $\hat{D}_2$ of the component $D_2$ of signal D.

Signal M thus comprises a constant component M1 which is represented by the term $K3.\hat{D}_1.\cos\phi_1$ of equation (7), and a component M2 that varies in dependence on the transducer's angular speed and which is represented by the term $K3.\hat{D}_2.\cos(\phi_1 + \phi_2)$ of equation (7).

Now, in a first approximation, the phase-shift $\phi_1$ is zero because the transducer's vibration that creates the component $D_1$ of signal D is in phase with the vibration caused by exciting signal E. Further, still in a first approximation, the phase-shift $\phi_2$ is equal to $\pi/2$ since, when the transducer's angular speed is not zero, the elongation of each point of the transducer which vibrates in the vibration that creates the component $D_2$ of signal D is proportional to the Coriolis force being applied on the transducer, this Coriolis force is proportional to the speed of this point in the vibration that creates the component $D_1$ of signal D, and this speed is phase-shifted by $\pi/2$ in relation to the elongation of this point in this latter vibration, which elongation is of course in phase with the exciting signal E.

In this first approximation, signal M is therefore independent of the transducer's angular speed since the factor $\cos(\phi_1 + \phi_2)$ of the component $M_2$ of signal M is equal to zero.

In practice, the phase-shifts $\phi_1$ and $\phi_2$ are generally slightly other than zero and $\pi/2$, respectively, because of the transducer's mechanical losses.

The factor $\cos(\phi_1 + \phi_2)$ of the component $M_2$ of signal M is therefore not zero, and this signal M can therefore actually vary in dependence on the transducer's angular speed.

But this factor $\cos(\phi_1 + \phi_2)$ is always very small since the sum of the phase-shifts $\phi_1 + \phi_2$ is close to $\pi/2$ so that the component $M_2$ of signal M is always much smaller than component $M_1$ unless the transducer's angular speed and hence the amplitude $\hat{D}_2$ of the component $D_2$ of signal D are very large.

Clearly, the circuit described in U.S. Pat. No. 4,671,112 cannot properly be used in a device for measuring a relatively small angular speed because the signal M it produces then essentially consists of a component $M_1$ that is independent of this angular speed on which is superposed a component $M_2$ of low, or even very low, amplitude in relation to that of component $M_1$. Such a signal M is in practice difficult to use.

It should be noted that this same drawback occurs with all circuits of the kind described in U.S. Pat. No. 4,671,112, i.e. circuits which mix, in one way or another, a signal that is produced directly or indirectly by the transducer's detection electrodes with a signal that is derived from the exciting signal of the transducer.

In other words, the sensitivity of angular speed measuring devices using such circuits is low.

Further, the presence in such circuits of analog amplifiers whose components have characteristics able to vary with respect to time and/or temperature means that the signal M that is produced by these circuits also varies with respect to these parameters. Signal M is therefore not stable.

It is of course conceivable to complete this kind of circuit with a circuit capable of subtracting from signal M a constant compensatory signal equal to the component $M_1$ of signal M so as only to retain the useful component $M_2$ of signal M, and to amplify as much as is necessary the signal resulting from this subtraction.

But the amplitude $\hat{D}_1$ and the phase-shift $\phi_1$ of the component $D_1$ of signal D can vary from one transducer to the next even with transducers of the same type. The production of the above mentioned compensatory signal therefore implies not only having to measure amplitude $\hat{D}_1$, something that does not in general give rise to any particular difficulty, but also having to measure phase-shift $\phi_1$, a far trickier operation since this phase-shift is very close to zero. Moreover, the characteristics of the components of the circuit that produces this compensatory signal and that cause the latter to be subtracted from signal M may also vary with respect to time and/or temperature, thereby reducing still further the stability of measurement signal M.

An object of the present invention is to propose an angular speed measuring device that does not suffer from the above drawbacks, i.e. that supplies a measurement signal that is stable and readily usable regardless of the transducer being used and of the latter's angular speed.

SUMMARY OF THE INVENTION

This object is achieved thanks to the fact that the means for producing the measurement signal comprises means for producing a signal which is representative of the phase-shift between the exciting signal and the detection signal, this phase-shift being itself representative of the transducer's angular speed.

Other objects and advantages of the present invention will become apparent from the following description which will be made with reference to the accompanying drawings.

Figure 1:
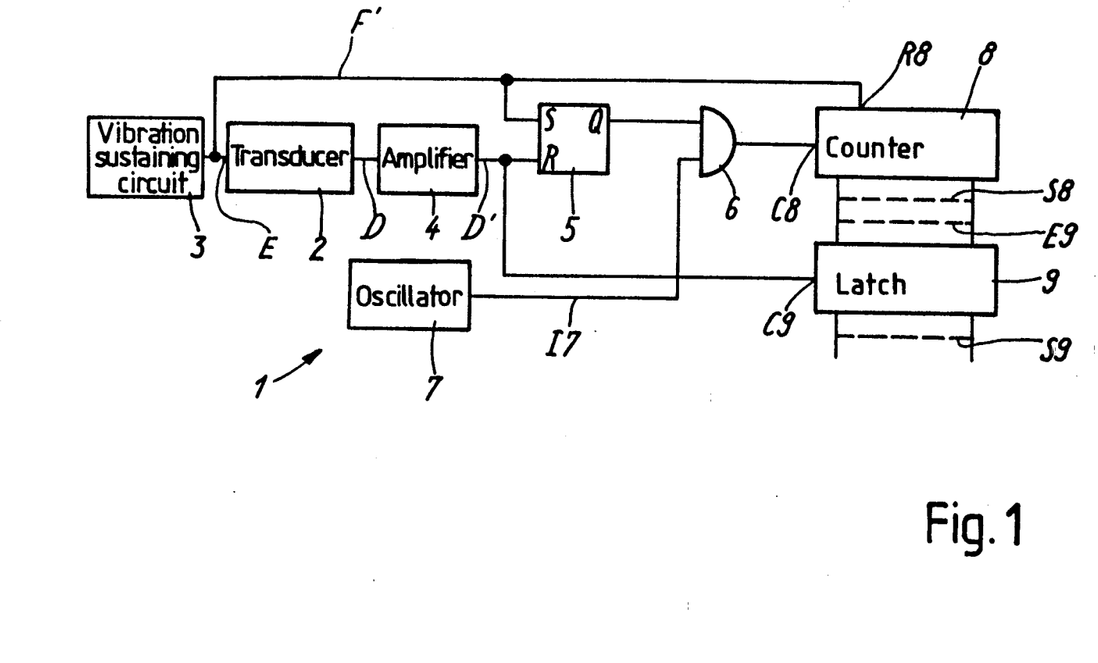
FIG. 1 is a block diagram of a first embodiment of the invention.

In the device shown in FIG. 1 and referenced 1, the transducer meant to rotate at the angular speed it is desired to measure is symbolized by block 2.

Transducer 2 has not been shown in detail because it can be similar to any one of the many known transducers, e.g. the transducer described in the above-mentioned U.S. Pat. No. 4,899,587.

In well-known manner, transducer 2 comprises electrodes, not shown, for exciting its vibration and which are connected to a circuit 3 for sustaining this vibration. The oscillating circuit formed by transducer 2 and its sustaining circuit 3 supplies a periodic exciting signal having a frequency which is essentially determined by the characteristics of transducer 2. This signal will hereinafter be called exciting signal E, as above.

For a reason which will hereinafter be made clear, it is necessary to have, in the FIG. 1 device, a periodic logic signal, i.e. a signal that periodically assumes the logic states low and high, having the same frequency and the same phase as exciting signal E. This periodic logic signal will be called reference signal F'.

In some cases, transducer 2 and sustaining circuit 3 are such that the exciting signal E already has the shape and amplitude of a logic signal and can therefore directly be used as reference signal F'. FIG. 1 illustrates such a case.

In other cases, transducer 2 and sustaining circuit 3 may be such that the exciting signal E does not have the shape and/or amplitude of a logic signal. This exciting signal may even, in some cases, have a dc component that is superposed on its ac component. In such cases, it is possible to add to the FIG. 1 device a suitable amplifying and/or shaping circuit whose input is connected to the output of sustaining circuit 3 and which is so arranged as to produce at its output a periodic logic signal that is in phase with signal E, i.e. a logic signal which passes from its low state to its high state at each instant when signal E, or its alternating component as the case may be, passes through its zero value on the rise, i.e. from its negative values to its positive values, and conversely. This logic signal may then be used as reference signal F'.

Such an amplifying and/or shaping circuit has not been illustrated as its structure depends on the shape and amplitude of exciting signal E and as its design would not cause difficulty to a specialist in the art.

In an equally well-known manner, transducer 2 comprises detecting electrodes, not shown, that produce the above-described detection signal D.

For a reason which also becomes apparent further on in this description, it is necessary to have in the FIG. 1 device a periodic logic signal in phase with this signal D, which will be called signal D'.

In the device shown in FIG. 1, as also in most devices of this kind, detection signal D is not a logic signal and, depending on the kind of transducer being used, it may have a dc component and an ac component that are superposed.

Logic signal D is thus applied to the input of an amplifying and/or shaping circuit, referenced 4, which is arranged to issue on its output the desired signal D', i.e. a periodic logic signal that passes from its low state to its high state at each instant when signal D, or its ac component, passes through its zero value on the rise, i.e. from its negative values to its positive values, and conversely.

This amplifying and/or shaping circuit 4 will not be described in detail here as its structure depends on the shape and on the amplitude of signal D and as its design will not cause difficulty to a specialist in the art.

The FIG. 1 device further comprises an SR type flip-flop 5 whose S and R inputs respectively receive the above-mentioned signals F' and D'. Flip-flop 5 is arranged so that its Q output switches to logic state high and to logic state low in response to its input S and, respectively, to its input R switching from logic state low to logic state high.

The Q output of flip-flop 5 is connected to one input of an AND gate 6 whose second input is connected to the output of an oscillator circuit 7.

Oscillator circuit 7 issues a periodic logic signal formed of pulses, hereinafter designated pulses I7. Further, as will be made clear later on, the accuracy and resolution of the measurement of the angular speed of transducer 2 are very much dependent on the accuracy of the frequency of pulses I7 supplied by oscillator 7 and on the ratio between this frequency and that of the exciting signal E of transducer 2. Oscillator 7 is therefore so arranged that the frequency of pulses I7 will be stable and much higher, e.g. several hundred or even several thousand times higher, than the frequency of signal E. Oscillator 7 may, for example, be a quartz oscillator.

The output of gate 6 is connected to the clock input C8 of a counter 8 made up, in conventional manner, of a plurality of flip-flops which have not been shown separately.

Counter 8 has moreover a reset input R8 which is connected to the S input of flip-flop 5 and which therefore also receives signal F', and is so arranged that the outputs of its constituent flip flops all switch to logic state low when signal F' switches from logic state low to logic state high.

The outputs of the flip-flops that make up counter 8 will be called outputs of counter 8 and collectively referenced S8, and the binary number formed by the logic states low or high of outputs S8 will hereinafter be called number B8.

The outputs S8 of counter 8 are connected, each, to one of the inputs of a memory circuit 9 better known as a latch and consisting of the same number of flip-flops as counter 8. The above-mentioned number B8 is thus permanently present at the inputs of latch 9, collectively referenced E9.

In conventional manner, latch 9 has a control input C9, which is connected to the output of amplifier 4 and which therefore receives signal D', and outputs, collectively referenced S9, which are made up of the outputs of the flip-flops constituting latch 9.

The binary number formed by the logic states low or high of outputs S9 will hereinafter be termed number B9.

Again in conventional manner, latch 9 is so arranged that the logic state of each of its inputs is transferred to the corresponding output, or, in other words, that number B9 becomes equal to number B8, in response to its input C9 switching from logic state low to logic state high.

The operation of the device in FIG. 1 will be described with reference to FIG. 2 in which the several graphs are given the same references as the signal they represent.

In this description, the instants at which signals F' and D' switch from logic state low to logic state high will respectively be called instants $t_0$ and $t_1$, and the periods separating each instant $t_0$ from the immediately following instant $t_1$ will be called periods T. Wherever required, these references will be given an index, or an additional index, to differentiate them.

Before instant $t_{01}$ which is arbitrarily taken as the starting point of this description, the above defined numbers B8 and B9 are equal, for a reason that will become clear further on, and have a value $n_0$.

At instant $t_{01}$, the switching of signal F' from its logic state low to its logic state high causes counter 8 to be reset to zero and the Q output of flip-flop 5 to switch to logic state high. Number B8 thus becomes equal to zero but number B9 retains its value $n_0$.

Immediately after being reset, counter 8 starts counting pulses I7 which are transferred to its input C8 via gate 6 because the Q output of flip-flop 5 is now at logic state high. Number B8 thus increases by one unit each time the input C8 of counter 8 receives a pulse 17, but number B9 does not change.

At instant $t_{11}$, which is the instant $t_1$ that immediately follows instant $t_{01}$, the switching of signal D' from logic state low to logic state high causes the Q output of flip flop 5 to revert to logic state low. This blocks gate 6 and causes counter 8 to stop as its input C8 no longer receives any pulses. Number B8 reaches, at instant $t_{11}$, a value $n_1$ which is equal to the number of pulses I7 produced by oscillator 7 between the instants $t_{01}$ and $t_{11}$, i.e. during period $T_1$.

At same instant $t_{11}$, the same switching of signal D' from logic state low to logic state high also causes number B8 to be transferred to the outputs S9 of latch 9. Number B9 thus also takes the value $n_1$.

Since the frequency of pulses I7 is stable, this value $n_1$ of number B9 is proportional to the duration $d_1$ of period $T_1$.

Figure 2:
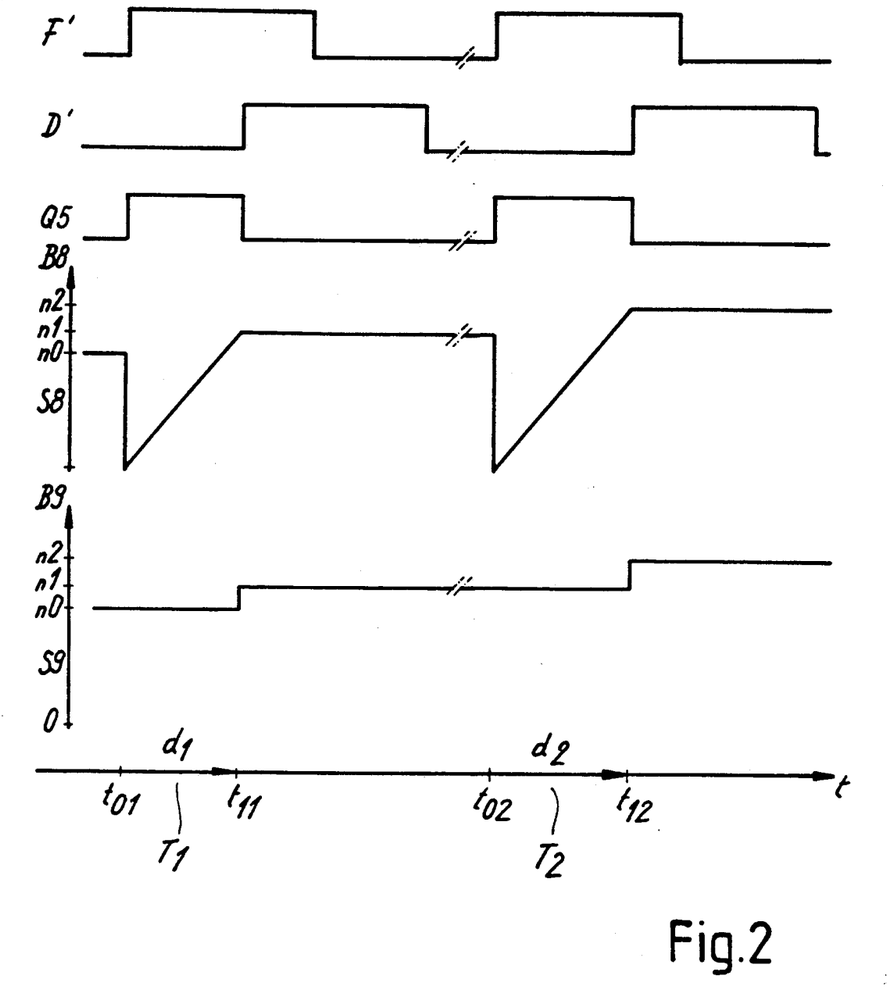
FIG. 2 is a graph showing signals measured at a number of points in the diagram of FIG. 1.

It will readily be seen that the above described process repeats itself at each instant $t_0$, e.g. at the instant $t_{02}$ indicated in FIG. 2. In that example, after the instant $t_{12}$ that immediately follows instant $t_{02}$, number B9 takes on a value $n_2$ which is proportional to the duration $d_2$ of period $T_2$.

More generally, number B9 takes on, at each instant $t_1$, a value n which is proportional to the duration d of the period T that ends at this instant $t_1$ and hence to the phase-shift of signal D' in relation to signal F'. This phase-shift, hereinafter designated $\phi$ is thus given by the equation:

$$\phi = n.T7.\omega \quad (8)$$

in which T7 is the period of pulses I7 and $\omega$ is, as above, the angular frequency of signal F'.

Since signals F' and D' are respectively in phase with the exciting signal E of transducer 2 and with the detection signal D produced by the latter, the phase-shift $\phi$ is also the phase shift of signal D in relation to signal E.

The phase-shift $\phi$ can of course be also calculated from the equation for signal D.

It has been shown above that, depending on the transducer being used, signal D can be sinusoidal or non-sinusoidal.

In the first case, signal D is obviously expressed by the equation (5) mentioned earlier.

In the second case, the equation for signal D is more complex than equation (5), but it can always be put in the form of a Fourier series whose first non constant term is identical to the second term of equation (5) and represents the fundamental component of signal D. As this fundamental component is obviously in phase with the actual signal D, equation (5) may therefore be used to calculate the phase-shift of signal D, whatever its shape, in relation to signal E.

This calculation, which will not be made here in detail as it only involves well-known principles of trigonometry and does not give rise to any particular difficulty, shows that this phase-shift $\phi$ is given by the equation:

$$\phi = \phi_1 + \text{arctg} \frac{\hat{D}_2 \cdot \sin \phi_2}{\hat{D}_1 + \hat{D}_2 \cdot \cos \phi_2} \quad (9)$$

This phase-shift $\phi$ of signal D in relation to signal E, and hence also of signal D' in relation to signal E', thus depends on the amplitude $\hat{D}_2$ of signal D, which itself depends on the angular speed of transducer 2. This phase-shift $\phi$ and the value n of number B9 that is proportional thereto as is apparent from the above equation (8), are thus measurements of this angular speed.

By combining the above equations (8) and (9), it will readily be seen that the value n of number B9 at any instant $t_1$ is given by the equation:

$$n = \frac{1}{T_7 \cdot \omega} \cdot \left( \phi_1 + \text{arctg} \frac{\hat{D}_2 \cdot \sin \phi_2}{\hat{D}_1 + \hat{D}_2 \cdot \cos \phi_2} \right) \quad (10)$$

This equation shows that, like the signal M represented by the earlier equation (7), the value n of number B9 includes a first component, $n_{\nu 0}$, that is independent of the angular speed of transducer 2 and which is expressed by the equation:

$$n_{\nu 0} = \frac{1}{T_7 \cdot \omega} \cdot \phi_1 \quad (11)$$

and a second component, $n_\nu$, which depends on the angular speed and which is expressed by the equation:

$$n_\nu = \frac{1}{T_7 \cdot \omega} \cdot \text{arctg} \frac{\hat{D}_2 \cdot \sin \phi_2}{\hat{D}_1 + \hat{D}_1 \cdot \cos \phi_2} \quad (12)$$

But unlike what happens with the signal M expressed by equation (7), this second component $n_\nu$ does not cancel itself when transducer 2 is such that the phase-shift $\phi_2$ is equal to $\pi/2$ since equation (12) then becomes:

$$n_\nu = \frac{1}{T_7 \cdot \omega} \cdot \text{arctg} \frac{\hat{D}_2}{\hat{D}_1} \quad (13)$$

It will be observed that device 1 supplies a measurement signal, consisting of binary number B9, regardless of the characteristics of transducer 2, such not being the case with the known device described in U.S. Pat. No. 4,671,112 mentioned earlier. It will also be observed that this measurement signal is much more stable than the one supplied by this known device as it in no way depends on the gain of one or more analog-type circuits.

The phase-shift $\phi_1$ of the component $D_1$ of detection signal D in relation to the exciting signal E is always close to zero or even equal to zero.

When device 1 is intended to measure relatively high angular speeds, the first component $n_{v0}$ of the value n of number B9 may therefore be neglected as it is small compared to the second component $n_v$ of this value n.

But when device 1 is intended to measure low angular speeds and the phase-shift $\phi_1$ of its transducer 2 is other than zero, which is generally the case, this first component $n_{v0}$ cannot be neglected as it can be larger than the second component $n_v$, or be of the same order of magnitude as the latter.

Also, since the phase-shift $\phi_1$ can vary from one transducer to another, this first component $n_{v0}$ may also vary from one measuring device to another.

Figure 3:
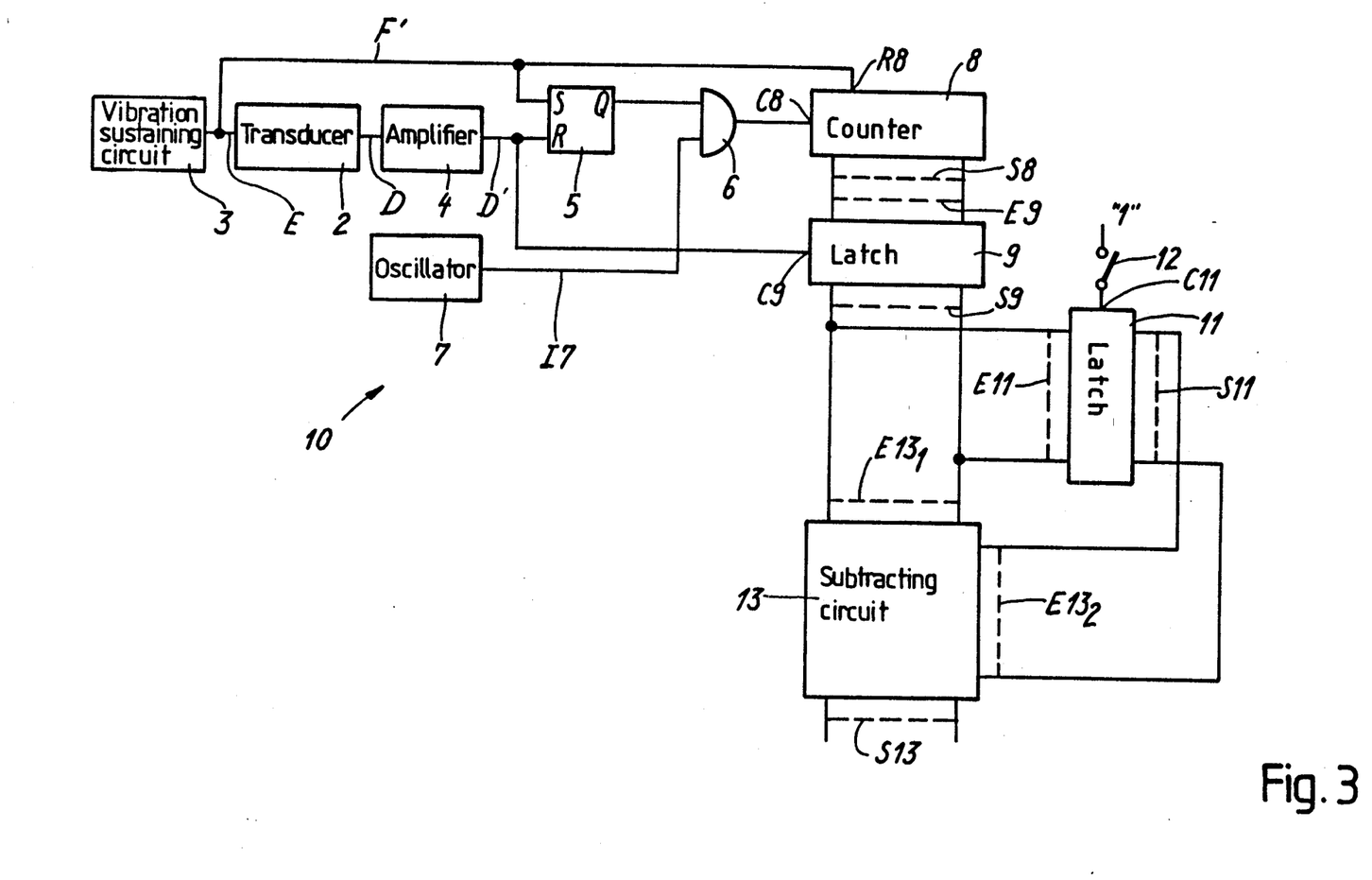
FIGS. 3 to 5 diagrammatically represent other embodiments of the angular speed measuring device according to the invention.

FIG. 3 is a diagrammatic representation of an embodiment of the device according to the invention for measuring an angular speed, which issues a measurement signal of this angular speed which is independent of the phase-shift $\phi_1$ of its transducer.

The device shown in FIG. 3 is referenced 10. The elements 2 to 9 of device 10 are identical to the elements bearing the same references in the device 1 of FIG. 1 and are connected to one another in the same way as these latter elements. Elements 2 to 9 will therefore not again be described here.

In addition to elements 2 to 9, device 10 comprises a latch 11, an on-off switch 12 and a binary subtracting circuit 13.

The latch 11 has a storage capacity identical to that of latch 9, and each of its inputs, collectively referenced E11, is connected to one of the outputs S9 of latch 9.

For a reason which becomes clear later on in this description, latch 11 is preferably of the type of latch that preserves information even in the absence of a supply voltage, this information being however modifiable at will. Such circuits are often designated by the acronym EPROM consisting of the initials of "Electrically Programmable Read Only Memory".

The control input C11 of latch 11 is connected to a first terminal of switch 12 whose second terminal is connected to the terminal of the supply source, not shown, of device 10 and whose potential corresponds to the logic state high.

Switch 12 may be actuated, e.g. by a push-button not shown, to apply this logic state high to control input C11 in circumstances that will be described later.

The subtracting circuit 13 comprises first inputs, collectively referenced E13$_1$, which are equal in number to the outputs S9 of latch 9 and are each connected to one of the latter. Circuit 13 also comprises second inputs, collectively referenced E13$_2$, which are equal in number to the outputs S11 of latch 11 and are each connected to one of the latter.

Circuit 13 further comprises outputs collectively referenced S13, and is so arranged that the binary number formed by logic states low or high of outputs S13, .. hereinafter termed number B13, is equal to the difference between number B9 and the binary number which is formed by the logic states low or high of the outputs S11 of memory circuit 11 and which will hereinafter be termed number B11.

The operation of the part of device 10 formed by elements 2 to 9 is identical to that of device 1 and will therefore not be described again in detail.

It has been seen above that when the angular speed of transducer 2 is zero, number B9 has the value $n_{v0}$ given by equation (11), such number being constant for a given transducer 2 and being proportional to the phase-shift $\phi_1$ specific to this transducer 2.

If, with the angular speed of transducer 2 still being zero, switch 12 is briefly closed, number B11 becomes equal to number B9 and therefore takes on value $n_{v0}$. Number B13, which is then equal to the difference between two equal numbers, thus becomes equal to zero.

Thus, after the above closure of switch 12, the value of number B13 is permanently equal to the value $n_v$ given by equation (12) above, since it is always equal to the difference between the value n of number B9 given by equation (10) and the value $n_{v0}$ of the constant component of this value n. Number B13 thus constitutes a measurement signal for measuring the angular speed of transducer 2 which is independent of the phase-shift $\phi_1$ that is specific to the latter and which, in particular, is always zero when this angular speed is zero.

This brief closure of switch 12 constitutes a calibration operation for device 10. This calibration operation can be combined with the tests to which each device is subjected after the assembly of its components or can be carried out after having fitted the device in its final setting.

Obviously, after this calibration, switch 12 must be rendered inoperative at least when the angular speed of transducer 2 is not zero, in order to prevent number B11 being replaced by another number having a value other than value $n_{v0}$.

It is only when the transducer 2 of a device 10 has to be replaced by another, for one reason or another, that switch 12 needs to be actuated again to recalibrate the device by causing in the manner described above, latch 11 to memorize a number B9 having a new value $n_{v0}$ corresponding to the new transducer.

It will further be seen that it is also preferable to use an EPROM circuit for latch 11 because the value $n_{v0}$ it memorizes will then not disappear in the event of an interruption in the voltage supply of device 10.

The relationship between the angular speed of transducer 2 and the amplitude $\hat{D}_2$ of the component $D_2$ of signal D which depends on this angular speed is in general linear, but it can be different from one transducer to another.

Further, the above equation (12) shows that the value $n_v$ of number B13 does not vary linearly with amplitude $\hat{D}_2$, and depends on the above defined amplitude $\hat{D}_1$ and phase-shift $\phi_2$ which are constant for a given transducer but can also vary from one transducer to another.

It follows from the above that the relationship between the angular speed of transducer 2 and the value nv of number B13 is not linear and that it can vary from one measuring device to another.

It should however be noted that, in practice, the phase-shift $\phi_2$ between the component $D_2$ of detection signal D and the exciting signal E is very close to $\pi/2$, so that it can be assumed that the component $n_v$ of the value n of number B9 is given by the equation (13) above.

If moreover the amplitude $\hat{D}_2$ of the component $D_2$ of detection signal D is small in relation to the amplitude $\hat{D}_1$ of the constant component $D_1$ of signal D, such being the case when the angular speed of transducer 2 is low, it may be assumed that the relationship between this angular speed and the value n of number B9 is substantially linear, as it is then possible to replace in equation (13) the term $$\text{arctg}\, \frac{\hat{D}_2}{\hat{D}_1} \text{ by the term } \frac{\hat{D}_2}{\hat{D}_1}.$$

Figure 4:
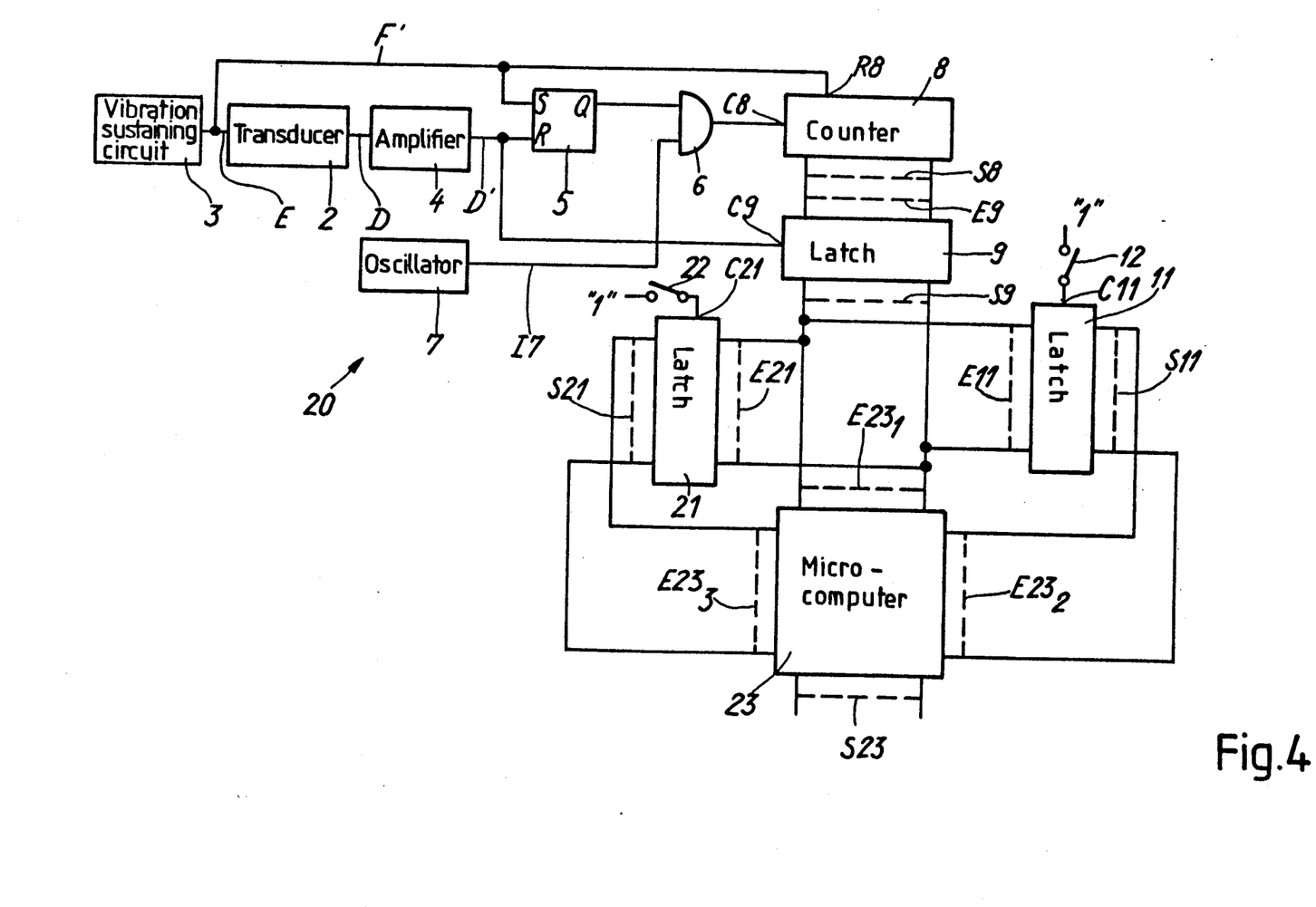

FIG. 4 diagrammatically illustrates an embodiment of the device according to the invention, which supplies a measurement signal whose relationship with the measured angular speed is the same for all devices made in accordance with this embodiment.

The elements 2 to 9, 11 and 12 of the device shown in FIG. 4, in which it is referenced 20, will not again be described here as they are identical to those bearing the same references in FIG. 3 and are connected to one another in the same way as these latter elements.

Besides elements 2 to 9, 11 and 12, device 20 comprises a latch 21, a switch 22 and a micro-computer 23.

Latch 21 has the same storage capacity as latches 9 and 11 and, like the latter, it is preferably of the EPROM type. The inputs of latch 21, collectively referenced E21, are respectively connected to the outputs S9 of latch 9.

The control input C21 of latch 21 is connected to a first terminal of switch 22 whose second terminal is connected, like the second terminal of switch 12, to the terminal of the supply source of device 20 having a potential corresponding to the logic state high.

Switch 22 may be actuated, as by a push-button, not shown, to apply this logic state high to the control input C21, latch 21 responding to this logic state high by transferring to its outputs, collectively referenced S21, the binary number B9 that is present at its inputs S21.

The micro-computer 23 may be any one of the numerous micro-computers available nowadays.

In the example shown in FIG. 4, it comprises first, second and third inputs respectively referenced E23$_1$, E23$_2$ and E23$_3$ and respectively connected to the outputs S9, S11 and S21 of latches 9, 11 and 21, and outputs collectively referenced S23.

The programming of micro-computer 23 will not be described here because it depends on the type of micro-computer and because a specialist will have no difficulty in devising it on reading the following description of the operation of device 20.

The operation of elements 2 to 9 of device 20 is identical to that of the elements of device 10 in FIG. 3 bearing the same references and will therefore not again be described here.

Like this device 10, device 20 can be subjected to a calibration operation, e.g. during the tests to which it is subjected on completion of its manufacture.

This calibration operation of device 20 consists first in briefly closing switch 12 while the angular speed of transducer 2 is zero, so as to store in latch 11 the value $n_{v0}$ of the number B9 corresponding to this transducer 2, as described in the case of device 10.

Transducer 2 is then rotated at a known, predetermined, speed and switch 22 is briefly closed.

In response to this closure of switch 22, latch 21 stores the value of the number B9 that is present at that instant at the outputs S9 of latch 9, this value being hereinafter designated $n_{v1}$. In other words, the binary number formed by the logic states low or high of the outputs S21 of latch 21 and hereinafter referenced B21, takes on this value $n_{v1}$.

It will become apparent that, after this calibration, the inputs E23$_1$, E23$_2$ and E23$_3$ of micro-computer 23 respectively receive numbers B9, whose value n is given by equation (10), B11, whose value $n_{v0}$ is given by equation (11), and B21, whose value $n_{v1}$ is equal to the value taken by number B9 when transducer 2 rotates at the above mentioned predetermined angular speed.

Micro-computer 23 is programmed to supply at its outputs, referenced S23, a binary number B23 whose value n' is calculated from the value n of number B9, in a manner such that it is zero when the angular speed of transducer 2 is zero and such that it is moreover independent of the transducer 2 being used.

Obviously, in this embodiment of the device according to the invention, the value n' of number B23 varies practically linearly with the angular speed of transducer 2 when this angular speed is sufficiently low for it being acceptable to replace, in equation (13), the term $$\text{arctg}\, \frac{\hat{D}_2}{\hat{D}_1} \text{ by the term } \frac{\hat{D}_2}{\hat{D}_1}.$$

In another one of its embodiments, which will not be described in detail as it can be designed without difficulty by a man of the art, the device according to the invention comprises, besides the elements shown in FIG. 4, one or more additional latches, identical to latch 21, whose inputs are also connected to the outputs S9 of latch 9, whose outputs are also connected to the inputs of micro-computer 23, and whose control inputs are each connected to a switch similar to switch 22.

In this embodiment, the calibration operations of the device include, as before, closing switch 12 when the angular speed of transducer 2 is zero, for storing the value $n_{v0}$ of number B9 in latch 11.

These calibration operations include also rotating transducer 2 at predetermined angular speeds, all different from one another, and, whenever transducer 2 rotates at one of these predetermined speeds, closing the switch that is associated with latch 21 or an additional latch, such as to store in latch 21 and in each additional latch the value of number B9 that corresponds to one of the predetermined speeds of transducer 2.

In this embodiment, micro-computer 23 is programmed to calculate the value n' of number B23 from the value n of number B9, while taking into account the values of the numbers stored in latches 11 and 21 and in the or each additional latch, whereby the relationship between this value n' and the angular speed of transducer 2 is not only independent of the transducer being used but also linear.

It should be noted that micro-computers in general only have a limited number of input and/or output terminals, and that it is generally not possible to design the device according to the invention exactly as in the embodiment just outlined or as in that of FIG. 4. But it will be obvious for a specialist that latches 11 and 21 and any additional latches can be replaced by well-known circuits having practically the same function, but whose outputs assume, in the absence of a specific control signal applied to one or more control inputs provided for that purpose, a state in which their impedance is very high. These latches and micro computer 23 are then connected, in a manner that is also well known and which will not be described here, to a set of conductors generally termed a bus. Again in well-known manner, micro-computer 23 is programmed to apply to this bus the control signal that is specific to one of the latches when it requires the information stored by this circuit to calculate the value of number B23, this information being also fed thereto via this bus.

It will be obvious for the specialist that all of the embodiments of the device according to the invention can be designed by using a micro-computer programmed to replace all of the other electronic circuits except sustaining circuit 3 and amplifying circuit 4. In this case, the values of the various binary numbers mentioned above are recorded in the internal memory of this micro-computer, and the latter is preferably supplied by a cell or by a battery so that these values should not be lost when the device is not being used.

In all of the above-described embodiments of the device according to the invention, the measurement signal of the angular speed of transducer 2 is obtained by measuring the phase-shift $\phi$ of detection signal D in relation to exciting signal E, i.e. by taking the latter as the reference signal.

When phase-shift $\phi$ is small, the accuracy of the measurement signal for measuring the angular speed of transducer 2 is also small.

In such an event it is possible to obtain a more accurate measurement signal for measuring this angular speed by inverting the functions of signals F' and D', i.e., for instance, by connecting the output of sustaining circuit 3 to the R input of flip-flop 5 and to the input C9 of latch 9 and by connecting the output of amplifying and/or shaping circuit 4 to the S input of flip flop 5 and to the reset input R8 of counter 8.

In this way, it is signal D that is taken as the reference, and it is the phase-shift $\phi'=2\pi-\phi$ of signal E in relation to this signal D that is measured. This phase-shift $\phi$ is greater than phase-shift $\phi$ if the latter is less than $\pi$, and the accuracy of the angular speed measurement signal that is obtained from this phase-shift $\phi'$ is greater than in the previously described embodiments.

Figure 5:
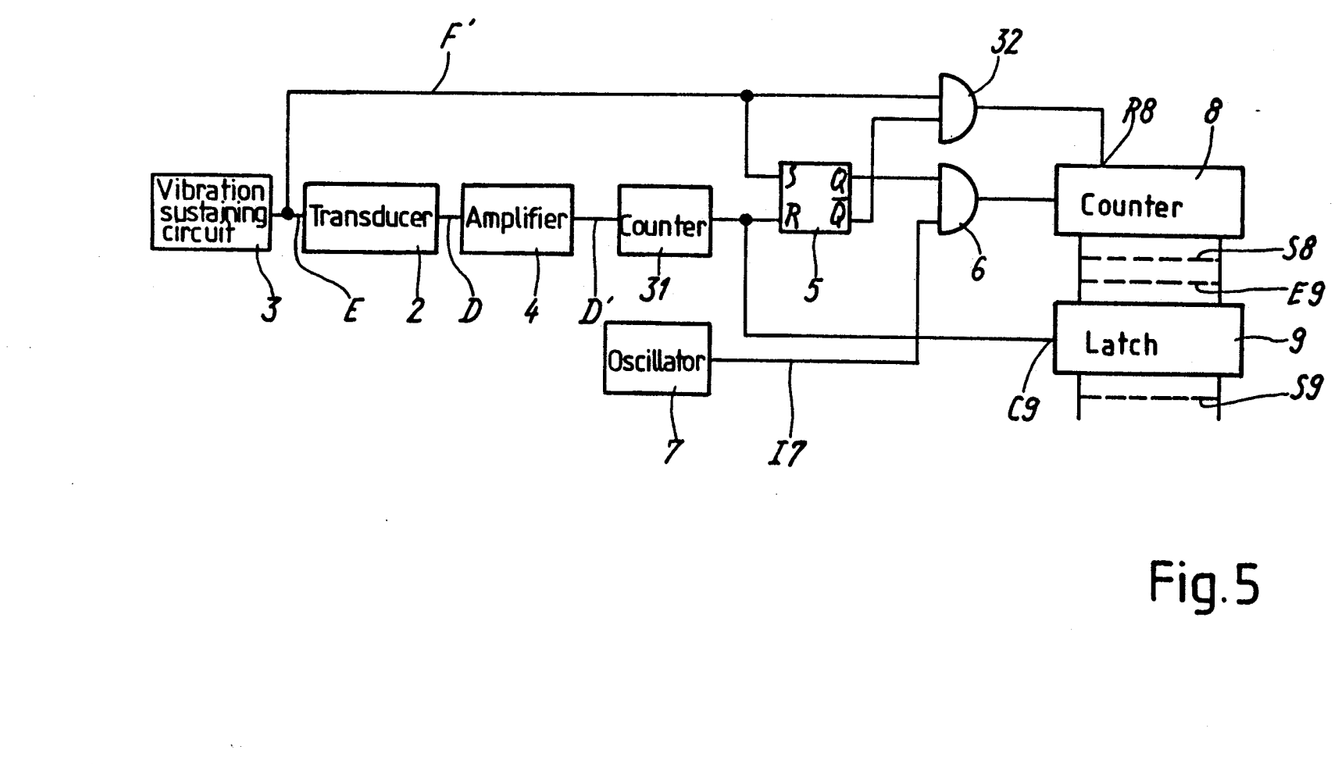

FIG. 5 illustrates another embodiment according to the invention, in which the accuracy of the measurement signal for measuring the angular speed of transducer 2 is also increased.

The components 2 to 9 that are visible in FIG. 5 are identical to those bearing the same references as in FIGS. 1, 3 and 4 and will therefore not again be described here.

In this embodiment, the device comprises, in addition to components 2 to 9, a counter 31 whose input is connected to the output of amplifying and/or shaping circuit 4 and therefore receives signal D', and whose output is connected to the R input of flip-flop 5 and to input C9 of latch 9.

In conventional manner, the contents of counter 31 increase by one unit each time its input, i.e. signal D', switches from logic state low to logic state high, and so on until said contents reach its maximum value. The next time signal D' switches to logic state high after that, the said contents return to zero and start again to increase. Further, the output of counter 31 is at logic state high when the counter's contents are equal to its maximal value, and at logic state low the rest of the time.

The FIG. 5 device comprises moreover an AND gate 32 whose inputs are respectively connected to the output of sustaining circuit 3 and to the $\overline{Q}$ output of flip-flop 5, and whose output is connected to the reset input R8 of counter 8.

When the Q and $\overline{Q}$ outputs of flip-flop 5 are respectively at logic state low and high, the switching of signal F' from logic state low to logic state high brings about, as in the other embodiments, the resetting of counter 8 and, immediately after this resetting, the start of the count of pulses I7 by this counter 8.

But in this embodiment, it is only when counter 31 has counted a certain number of switchings of signal D' from logic state low to logic state high, such number being equal to the counting capacity of counter 31, that flip-flop 5 returns to the state in which its outputs Q and $\overline{Q}$ are respectively at logic state low and high, thereby interrupting the counting of pulses I7 by counter 8 and causing number B8 to be transferred to the outputs S9 of latch 9.

Moreover, as long as the $\overline{Q}$ output of flip flop 5 is at logic state low, counter 8 is not reset by the changes of signal F' from logic state low to logic state high.

Counter 8 thus counts pulses I7 during several periods of signal D' between two of its successive resets. Its counting capacity and the storage capacity of latch 9 must of course be selected accordingly.

When number B8 is transferred from the inputs E9 to the outputs S9 of latch 9, its value is thus much greater than in the embodiments of FIGS. 1, 3 and 4, all other things being equal. The accuracy of the measurement signal formed by this number B8 is therefore also greater than in these embodiments.

It is also obvious that in all of the embodiments according to the invention, the binary number that is representative of the transducer's angular speed can be used to control an auxiliary device which may for example be a device for visually displaying the angular speed being measured, or an alarm device that simply issues a signal when this angular speed reaches a predetermined speed. Such auxiliary devices will not be described here as they can vary considerably from case to case.

What we claim is:

1. Measurement device for measuring an angular speed, comprising:

a transducer intended to rotate at said angular speed;

means for producing an exciting signal having a first frequency;

means for exciting a first vibration of said transducer in response to said exciting signal;

means for producing a detection signal including at least one component having a amplitude representative of the amplitude of a second vibration of said transducer, said second vibration being coupled to said first vibration and having an amplitude representative of said angular speed; and means for producing a measurement signal representative of said angular speed in response to said detection signal, including means for producing a signal representative of the phase shift between said exciting signal and said detection signal, said phase-shift being representative of said amplitude of said component of the detection signal, wherein said means for producing a signal representative of said phase-shift include:

means responsive to said exciting signal for producing a first logic signal having said first frequency and in phase with said exciting signal;

means responsive to said detection signal for producing a second logic signal in phase with said detection signal;

means for producing a signal comprising a plurality of periodic pulses having a second frequency grater than said first frequency; and counting means including a counter and means responsive to one of said logic signals to start the counting of said pulses by said counter and to the other of said logic signals to stop said counting, the outputs of said counter presenting, immediately after said stop, a first number that is equal to the number of said pulses counted by said counter between said start and said stop, and the value of said first number being representative of said phase-shift.

2. Measurement device according to claim 1, wherein said means for producing a signal representative of said phase-shift further include means for storing a second number having a value equal to the value of said first number when said angular speed is zero, and means for producing a third number having a value equal to the difference between the values of said first and second numbers.

3. Measurement device according to claim 1, wherein said means for producing a signal representative of said phase-shift further include means for storing a second number having a value equal to the value of said first number when said angular speed is zero, means for storing a third number having a value equal to the value of said first number when said angular speed has a first set value that is not zero, and means responsive to said first, second and third numbers to produce a fourth number having a value representative of said angular speed that is independent of said transducer.

* * * * *